(12) United States Patent
Olsen (10) Patent No.: US 11,344,012 B2
(45) Date of Patent: May 31, 2022

(54) FISHING LURE

(71) Applicant: Nomad Tackle Pty Ltd, Alderley (AU)

(72) Inventor: Damon Andrew Olsen, Cedar Creek (AU)

(73) Assignee: Nomad Tackle Pty Ltd, Alderley (AU)

( * ) Notice: Subject to any disclaimer, the term of this patent is extended or adjusted under 35 U.S.C. 154(b) by 206 days.

(21) Appl. No.: 16/334,958

(22) PCT Filed: Jun. 28, 2017

(86) PCT No.: PCT/AU2017/050662
§ 371 (c)(1),
(2) Date: Mar. 20, 2019

(87) PCT Pub. No.: WO2018/081852
PCT Pub. Date: May 11, 2018

(65) Prior Publication Data
US 2019/0261614 A1     Aug. 29, 2019

(30) Foreign Application Priority Data
Nov. 4, 2016 (WO) ................ PCT/AU2016/051057

(51) Int. Cl.
*A01K 85/16*     (2006.01)
*A01K 91/04*     (2006.01)

(52) U.S. Cl.
CPC .............. *A01K 85/16* (2013.01); *A01K 91/04* (2013.01)

(58) Field of Classification Search
CPC ......... A01K 85/16; A01K 91/04; A01K 85/00
See application file for complete search history.

(56) References Cited

U.S. PATENT DOCUMENTS

| | | | | |
|---|---|---|---|---|
| 2,535,392 | A | * 12/1950 | Dale | ...................... A01K 85/18 |
| | | | | 43/42.13 |
| 3,462,871 | A | * 8/1969 | Raymon | ................ A01K 85/16 |
| | | | | 43/42.47 |
| 4,006,552 | A | 2/1977 | Cunningham | |
| 4,090,317 | A | 5/1978 | Skwirut | |
| 4,528,770 | A | 7/1985 | McDiarmid | |

(Continued)

FOREIGN PATENT DOCUMENTS

| | | |
|---|---|---|
| CN | 203206997 U | 9/2013 |
| WO | 2015095871 A1 | 6/2015 |

OTHER PUBLICATIONS

Chinese Patent Office action for Application No. 201780080256.X dated Dec. 30, 2020 (9 pages including English language summary).

(Continued)

*Primary Examiner* — Monica L Barlow
*Assistant Examiner* — Madeline L Douglas
(74) *Attorney, Agent, or Firm* — Michael Best & Friedrich LLP (57) ABSTRACT

A fishing lure comprises a body having a front end and a rear end. A cavity is positioned towards the front end of the body, and the cavity has a longitudinal direction. A connection member is located at least partially in the cavity and retained thereto by one or more retaining members. Each retaining member is able to extend into the cavity to retain the connection member in the cavity in use. The connection member is able to move, in use, in a direction transverse to the longitudinal direction.

18 Claims, 9 Drawing Sheets

(56) References Cited

U.S. PATENT DOCUMENTS

| | | | | |
|---|---|---|---|---|
| 4,761,910 | A * | 8/1988 | Ninomiya | A01K 85/16 43/42.22 |
| 4,777,761 | A * | 10/1988 | Renaud | A01K 85/16 43/42.03 |
| 4,807,388 | A | 2/1989 | Cribb | |
| 5,168,652 | A | 12/1992 | Davis | |
| 5,337,508 | A * | 8/1994 | Pfeiffer | A01K 85/16 43/42.03 |
| 6,101,758 | A * | 8/2000 | Finley | A01K 85/16 43/42.22 |
| 7,107,720 | B2 | 9/2006 | Burggrabe et al. | |
| 2010/0126058 | A1 * | 5/2010 | Hughes | A01K 85/16 43/42.39 |
| 2013/0192121 | A1 * | 8/2013 | Ford | A01K 85/16 43/42.22 |
| 2013/0305587 | A1 * | 11/2013 | Takahashi | A01K 85/16 43/42.49 |

OTHER PUBLICATIONS

International Search Report for Application No. PCT/AU2017/050662 dated Aug. 30, 2017 (5 pages).
International Preliminary on Patentability Report for Application No. PCT/AU2017/050662 dated Sep. 10, 2018 (56 pages).
"AFTA 2016—Nomad DTX Minnow," Published on Jul. 27, 2017, Viewed on the Internet on Aug. 18, 2017 <https://www.youbtube.com/watch?v=d1ktcKYfFOU>.
"DTX Minnow—Autotune in Action," Published on Oct. 24, 2016, Viewed on the Internet on Aug. 18, 2017 <https://www.youtube.com/watch?v=G7M5939UILg>.
European Patent Office Extended Search Report for Application No. 17867053.5 dated Feb. 27, 2020 (10 pages).

\* cited by examiner

FISHING LURE

This disclosure accompanies an application that claims priority to PCT/AU2016/051057, the contents of which are incorporated herein in their entirety by reference.

TECHNICAL FIELD

This disclosure generally relates to a fishing lure. The lure finds particular application in sport and game fishing, but is in no way limited to this application.

BACKGROUND ART

Fishing lures are deployed at various depths to catch a variety of fish. Trolling, where a lure is deployed behind a boat and pulled through the water at a given speed, is often used, particularly to catch larger fish. Larger lures are used to catch larger fish, and larger fish are generally present at deeper water depths. Larger lures are also generally trolled at higher speeds compared to smaller lures.

The line used to connect the lure to the boat, usually fishing line, is attached generally towards a front portion of the lure at an attachment point. If the attachment point is not correctly aligned with the lure, then the lure may not track correctly through the water when being trolled. For example, in use, the lure may tend to drift to the left or right and then often returns to the surface and fails to swim naturally.

Incorrect tracking also tends to be magnified as the in-use depth of the lure increases when the trolling speed increases. For this reason, trolling is generally limited to speeds of below 8 knots. In addition, the maximum obtainable depth of a lure, in use, is at speeds of around 6-8 knots since speeds greater than 8 knots tend to increase the water resistance on the line causing the lure to swim shallower than intended, and also to not swim straight.

If a lure is deployed and it begins to track incorrectly, it is removed from the water and adjusted so that it tracks correctly. In some cases, it can take a few attempts of adjusting the attachment point to ensure that the lure tracks correctly, especially for larger lures. For some lures, it is not possible to adjust the attachment point, and this can render the lure useless. Further, the attachment point tends to be knocked out of alignment after a fish has been caught, meaning that the lure can require readjustment after every catch. In addition, manufacturing tolerances mean that most lures may even require adjustment before they can be used for the first time. Having to adjust a lure so as to provide correct tracking can decrease the lure lifetime, and increase lure setup time. Some anglers are also not skilled enough to properly adjust the lure to provide correct tracking.

It is to be understood that references herein to the prior art do not constitute an admission that such art forms a part of the common general knowledge of a person of ordinary skill in the art, in Australia or any other country.

SUMMARY OF THE DISCLOSURE

Disclosed herein is a fishing lure. The fishing lure as disclosed herein finds particular application in sport and game fishing, but is in no way limited to this application. In this regard, the lure can be readily resized for more general use in recreational (e.g. small fish) fishing, etc.

The fishing lure as disclosed herein comprises a body having a front end and a rear end. A cavity located towards the front end of the body. The term "towards" as used in relation to the location of the cavity should be interpreted broadly to mean located at the front end of the body, or located at an inset (set back) location from the body front end. The cavity extends in a longitudinal direction of the body. A connection member is located in the cavity at least partially in the cavity and retained therein by one or more retaining members, each retaining member able to extend into the cavity to retain the connection member in the cavity in use. The connection member is able to move, in use, in a direction transverse to the longitudinal direction. The term "substantially perpendicular" as used in relation to the direction of movement should be interpreted broadly to mean movement in a general perpendicular direction, such as in a direction in the range of about 60° to 120° relative to the longitudinal direction.

The transverse movement of the connection member in cavity can enable the lure to self-centre in use. In this regard, the connection member can move into a position that balances the relative forces applied to the lure such that it can track correctly. This can reduce lure setup time, since a tow point associated with the connection member may only need to be in approximately the correct position prior to use, whereby the remaining adjustment is performed by the lure itself in use. The need to adjust the tow point after each catch may also be eliminated. Further, allowing the lure to self-centre can allow the lure to be trolled at speeds greater than 10 knots, such as up to 14 knots, and potentially even faster speeds such as 15 knots or greater.

In an embodiment, the connection member movement in the transverse direction may comprise one or more of:
 a pivot/rotation laterally in the cavity in use;
 a movement generally up and down with respect to a base of the cavity in use;
 a laterally tilting movement from side to side within the cavity in use.

Each such movement may occur at the same time, thereby defining a vector of movement, which movement may again be generally transverse to the longitudinal direction.

For example, when the connection member is in the form of a plate, the plate may define a plane that, in use, extends generally vertically. The plate may be retained within the cavity such that the lateral pivot/rotation occurs at opposite ends of the connection member (e.g. one plate end pivots to one side of the cavity, and an opposite plate end pivots to the other side of the cavity, and vice versa). The plate may also be retained within the cavity such that the movement generally up and down with respect to the cavity base is a tilting up or rocking of the plate at one end, and a tilting or rocking down of the plate at the opposite end (and vice versa). The plate may further be retained within the cavity such that the tilting movement from side to side with respect to the cavity is a lateral tilting of the plate at an upper plate side, and an opposite lateral tilting of the plate at a lower plate side (and vice versa).

Thus, the configuration and retention of the connection member with respect to the lure can be such as to provide it with at least three degrees of freedom of movement with respect to the lure longitudinal direction (e.g. lure axis).

In each case, the pivoting/rotation back and forth and/or the tilting up and down, can generally be in a direction that is substantially perpendicular to the longitudinal direction.

An arm may be located in the cavity. The arm may be associated with the connection member such that, in use, the arm does not touch and/or transfer a force to the connection member. Preventing the arm from touching and/or transferring a force to the connection member may help the lure to self-centre in use. In some circumstances the retaining members may fail. In these circumstances, the connection member can then engage with the arm so that the connection member and the body do not separate from one another. This may be useful, for example, when the one or more retaining members fail when a size of a fish striking the lure is greater than the intended use of the lure. The arm may pass through a proximal aperture located in the connection member. A portion of the arm passing through the proximal aperture may define a loop. The proximal aperture may have an effective diameter about twice a diameter of the arm. This arrangement may help to prevent the arm from engaging the connection member in use, such as transferring a load from the connection member to the retaining member(s) during normal use of the lure. Minimising any contact and/or load transfer from the connection member to the arm in use may help to improve the self-centring ability of the lure.

The arm may extend from the cavity into the body. In another such embodiment, the arm may follow a labyrinthine path, extending through a series of passageways defined in the body, and optionally right through to the rear end of the body. When the arm extends through to the rear end of the body, the arm may be folded back onto itself to define an eyelet at the body rear end.

The body may also comprise one or more hook attachment points. The labyrinthine path of the arm through the body may be such as to define the one or more hook attachment points that e.g. each project from the body. Alternatively, the one or more hook attachment points may be separate from (i.e. separately defined to) the arm. The one or more hook attachment points may be separate from one another. Alternatively, each of the hook attachment points may be integral with one another.

In an embodiment, the one or more retaining members may pass through respective a respective aperture of the connection member. The respective aperture may have a diameter about 1.1 to 2.0 times greater than a diameter of the one or more retaining members. For example, the one or more retaining members may have a diameter of about 1.8 mm and the respective aperture may have a diameter of about 2.0 to 2.4 mm. In some embodiments, the connection member may be retained in the cavity with two retaining members. The retaining members may be pins. The pins may have a diameter of about 1.0 mm to 2.0 mm. In some embodiments, the pins may extend across the cavity in a direction substantially transverse to the longitudinal direction. The one or more retaining members may extend across an entire width of the cavity. For example, one or more of the one or more retaining members may engage both sides of the cavity, Alternatively, the one or more retaining members may extend across only a portion of the cavity so the one or more retaining members only engage with one sidewall of the cavity. The one or more retaining members may be stainless steel wire. The one or more retaining members may be a wear-resistant material. A ratio of a diameter of the one or more retaining members to the respective aperture in the connection member may range from about 1:1.45 to 1:1.65. Having ratios outside this range means that the ability of the lure to self-centre in use may be diminished, and the lure may start to track from side-to-side. This may mean that the lure may tend to blow out of the water.

In some embodiments the connection member may have a thickness about 50-80% of a width of the cavity. In some embodiments, the connection member may have a thickness that is about 66% of the width of the cavity. For example, the connection member may have a thickness of about 1.0 mm to 2.0 mm, such as 1.0 mm, 1.2 mm, 1.5 mm and 1.8 mm, and the cavity may have a width of about 1.5 mm to 2.0 mm, such as about 1.5 mm, 1.8 mm, 2.2 mm and 2.9 mm. In some embodiments, the cavity may be defined by sidewalls. The sidewalls may each have an upper portion and a lower portion. The upper portions of the sidewalls may have lips extending towards one another such that a width of the cavity between the lips is less than a width of the cavity between the lower portion. The lips may help to strength the cavity. In some embodiments, the width between the lower portion may be about 1.1 to 2.0 times greater than the width between the lips. For example, a width between the lips may be about 2.2 mm and a width between the lower portion may be about 3.5 mm. The lips may have a thickness of about 1.0 mm to 2.0 mm, such as 1.2 mm. In use the connection member may pivot about the one or more retaining members. The one or more retaining members may be spaced along the longitudinal direction. In some embodiment, the cavity may have no lips at the upper portion of the sidewall. In these embodiments, the sidewall may be straight walls.

A front end of the body may be configured to define a bib. The cavity may be defined to open out onto an in-use upper face of the bib (e.g. at a location that is set back from a distal front end of the bib). The size and shape of the cavity may be designed in accordance with the design and shape of the bib. A remainder of the body extending rearwardly from the bib may be configured to have a profile similar to that of a fish body.

The body may comprise an interior, a weighted portion, and a skin covering the interior and weighted portion. The interior may comprise foam. The interior may be hollow. The interior may have ribs arranged perpendicular to one another. The weighted portion may be provided by lead weights. The body may have one or more weighted portions. The weighted portions may be positioned proximate the one or more hook attachment points. The skin may have additional features, such as artificial fins or soft flexible regions, so as to attract fish. The skin may form the covering that defines the interior. The body may be painted to resemble a fish. Reflective surfaces may be applied to the skin so as to attract fish. The skin may be toughened to resist e.g. teeth from fish. The skin may be formed of ABS plastic.

In an embodiment, the connection member may have an eyelet for connection to a fishing line. The eyelet may be located towards a distal end of the connection member. The eyelet may be in the form of an aperture passing through the connection member. A ring may be fitted to the eyelet. Fishing line may be attached to the eyelet and/or ring.

The lure may be adapted to be trolled at a water speed of up to 15 knots. Generally, the larger the lure, the higher the troll speeds. For example, a lure with a length of approximately 200 mm may be trolled at a speed of 15 knots, whereas a lure with a length of approximately 165 mm may be trolled at a speed of 13 knots. Larger lures tend to attract larger fish which move at higher speeds. To attract and catch these larger fish, the lure tends to be deployed at deeper depths, such as >12 m, compared to smaller lures. The lure may have a body size ranging from approximately 40-250 mm, such as 85 mm, 100 mm, 120 mm, 140 mm, 165 mm, 200 mm or 250 mm.

Also disclosed is a fishing lure, comprising a body; and an connection member for attaching the body to line. The connection member is connected to the body by at least two connectors in a manner such that the connection member is moveable, in use, relative to the body.

In some embodiments the connection member may be moveable in a transverse direction relative to a longitudinal direction of the body. In some embodiments, the connection member may be moveable relative to the at least two connectors. This fishing lure may be otherwise as set forth above.

The disclosure also provides a fishing lure having a body having a front end and a rear end. A cavity may be disposed towards the front end of the body. The term "towards" as used in relation to the location of the cavity should be interpreted broadly to mean located at the front end of the body, or located at an inset (set back) location from the body front end. The fishing lure as disclosed herein may also comprise an arm extending in the cavity. The arm may have a first end rigidly affixed to the body at one end of the cavity and a second end having a tow point for attachment to a fishing line. When the lure is not in use (e.g. rest position) the arm may be aligned with a stationary longitudinal axis. This stationary longitudinal axis may extend centrally through the cavity. However, in use, the arm may be adapted to flex about the first end such that the second end of the arm can move laterally away from the stationary longitudinal axis, with arm movement in the cavity being possible in a multitude of directions.

The fishing lure as disclosed herein may further comprise an abutment portion extending into the cavity. The abutment portion may be arranged to locate at the arm when the arm is aligned with the stationary longitudinal axis. In use, when the arm moves away from the stationary longitudinal axis, the abutment portion may be able to act as a pivot point. For example, when the arm flexes in a direction that is generally towards the abutment portion, a distal part of the arm can pivot around the abutment portion.

The abutment portion may extend into the cavity from an in-use upper side thereof. Thus, when the arm flexes generally upwards in use, it can pivot around the abutment portion.

However, the arm may flex laterally and down without pivoting around the abutment portion. The abutment portion may be positioned to locate at the arm at a distance that is approximately 40-50%, optionally 47%, of the arm length taken from the first end. Adjusting the position of the abutment portion can be used to alter the diving and tracking characteristics of the lure.

The tow point of the arm second end may be defined as an eyelet. The eyelet may be formed by folding the arm back onto itself at a distal part of the arm. The folded back part of the arm may be fastened to that part of the arm that extends between the first and second ends. This fastening may be provided by welding at one or more points, such as spot welding. This fastening may alternatively be provided by adhesive, or by a lashing (such as fine metal wire or yarn) around the folded back distal part of the arm. The tow point may alternatively be provided by a ring secured to the second end of the arm. The ring may be attached by welding and/or adhesive.

The cavity may be elongate. The stationary longitudinal axis may generally correspond to an elongate, central (i.e. longitudinal) axis of the cavity. The stiffness of the arm and the size of the cavity may be such as to allow the arm to move (flex) in the multitude of directions in the cavity in use, without the arm touching a wall of the cavity. For example, at a distal portion of the arm beyond the abutment portion, the multitude of directions may be any direction in an x/y plane perpendicular to the stationary longitudinal axis. The arm stiffness and cavity dimensions, such as width and breadth, may be adjusted to adjust the characteristics of the lure. Lures for smaller fish may have different arm and cavity properties compared to lures for larger fish. For example, lures for larger fish tend to have a stiffer arm to compensate for the larger forces experienced in use, e.g. during trolling at high speeds, during a fish strike, etc.

The cavity can be any shape or size that allows the arm to appropriately flex. For example, the cavity may have a generally square or rectangular cross-sectional profile. The cavity may alternatively have a circular, elliptical, etc. cross-section that allows a combination of movement of the arm. The square or rectangular profile may be provided with a breadth and height that is approximately three times or greater than a thickness/diameter of the arm, although for some applications the breadth and height may be less than three times the thickness/diameter of the arm. The arm may be provided by a metal wire. The wire may be steel, such as stainless steel. The steel wire may have a diameter of approximately 0.3-4 mm, such as 0.6 mm, 1.0 mm, 1.8 mm or 2 mm.

The abutment portion may be provided by a pin, optionally of metal. The metal pin may have a diameter in the range of 2-3 mm, such as approximately 2.5 mm. The pin may have a length of up to 18 mm. The abutment portion may be provided by a wear-resistant material, such as surface treated metal, hardened/toughened plastics, etc. A combination of a metal pin and wear-resistant material can be used as the abutment portion. The pin may be arranged to extend laterally of the body, and transversely with respect to the cavity at a side (e.g. upper side) thereof. This arrangement can help to distribute loads applied to the pin in use into the body. In a variation, the abutment portion may be formed integrally with the body, and may be provided by a region in the body having increased wear resistance.

The arm may extend beyond its first end into the body. In one such embodiment, the arm may terminate a short distance into the body but sufficiently to enable the rigid affixing at the arm first end.

Also disclosed herein is a fishing lure, comprising: a body having a front end and a rear end; an elongate cavity towards the front end of the body; and an arm rigidly affixed to the body and extending through the cavity to terminate at a tow point for attachment to a fishing line. The cavity surrounds the arm to be spaced therefrom.

The lure may further comprise an abutment portion extending into the cavity. When the lure is not in use the abutment portion may be arranged to locate at the arm when the arm is aligned with a stationary longitudinal axis. In use, when the arm is caused to move away from the stationary longitudinal axis, the abutment portion may act as a pivot point.

This fishing lure may be otherwise as set forth above.

BRIEF DESCRIPTION OF THE DRAWINGS

Non-limiting embodiments will now be described, by way of example only, with reference to the accompanying drawings, in which.

DETAILED DESCRIPTION OF SPECIFIC EMBODIMENTS

Figure 1:
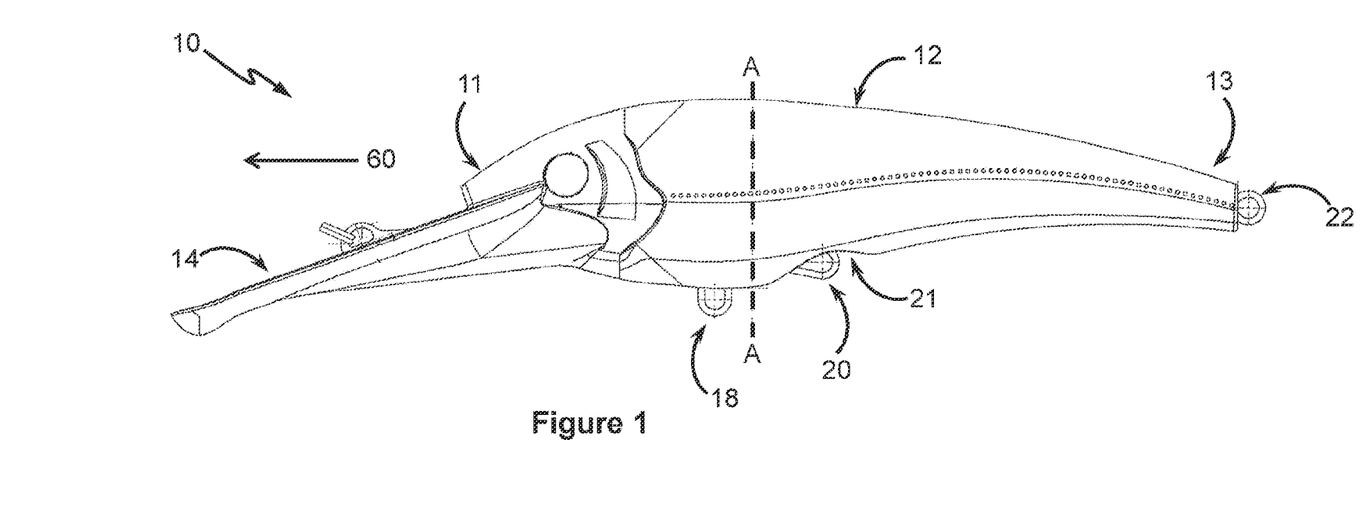
FIG. 1 shows an elevation view of an embodiment of a fishing lure as disclosed herein.

FIG. 1 shows a first embodiment of a fishing lure 10. The lure 10 can be employed for catching a variety of fish and may, for example, be suitable for game fishing. Fishing lure 10 has a body 12 having a front end in the form of a nose 11 and a rear end in the form of a tail 13. The body 12 has a profile similar to that of a fish. However, the body can have any other profile suitable for attracting fish.

Figure 4:
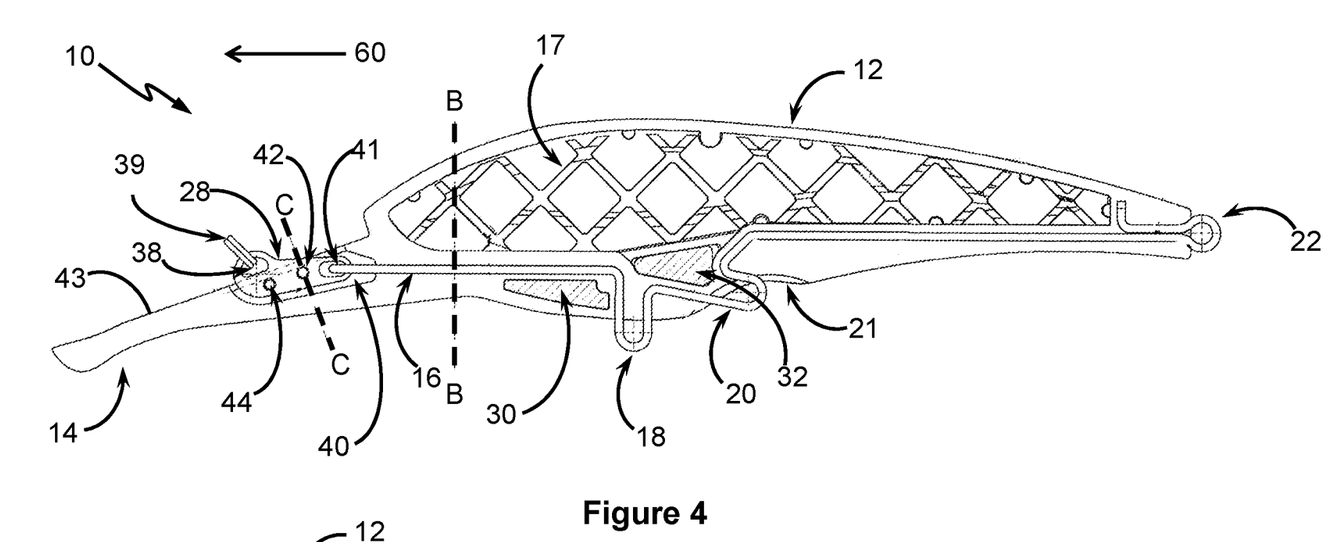
FIG. 4 shows an internal arrangement of the lure from FIG. 1.

An eyelet in the form of ring 22 is positioned at the tail 13. Ring 22 allows a fishing hook to be attached to the tail 13 of the body 12. The body 12 also has two fishing hook attachment points, in the form of first U-shaped projection 18 and second U-shaped projection 20, which are positioned approximately in the middle of the body 12. Ring 22 and U-shaped projections 18 and 20 have an inner radius of about 4.0 mm to 4.9 mm. Other inner radii can be used, and the radii size can be determined, in part, by target fish size for the lure and the size of any associated fishing hooks. In the embodiment of FIG. 1, ring 22 and U-shaped projections 18 and 20 are integrally formed from a rod 16, as best shown in FIG. 4. To form the ring 22 and projections 18 and 20, rod 16 follows a labyrinthine path. In other embodiments, ring 22 and U-shaped projections 18 and 20 are not integrally formed from a rod 16 and instead are formed from two or more sections of rod (not shown). In an embodiment, rod 16 is stainless steel wire having a diameter about 1.0 to 2.0 mm, such as about 1.8 mm, 1.6 mm or 1.2 mm.

Figure 2:
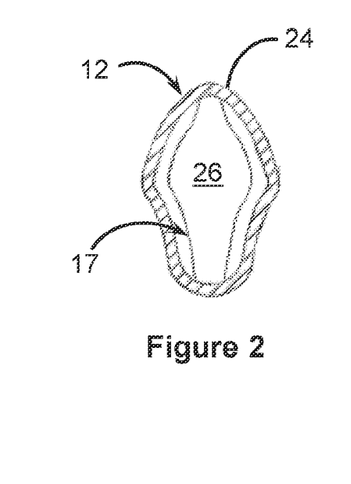
FIG. 2 shows a cross-section along line A-A in FIG. 1.
Figure 3:
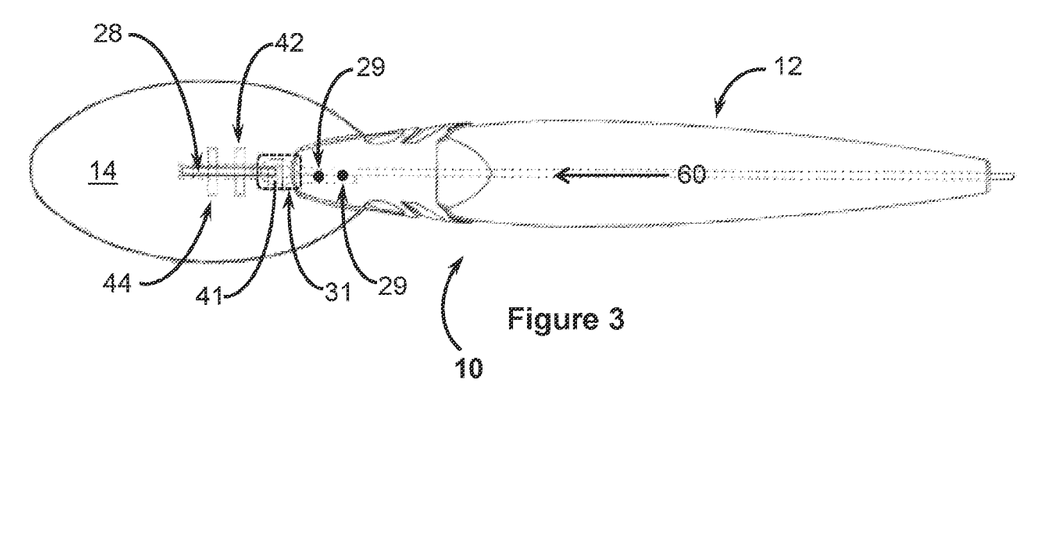
FIG. 3 shows a plan view of the fishing lure of FIG. 1 in which only some internal features depicted.

The body 12 has a generally elongate body shape (FIG. 3), with a cross-section similar to that of a fish (FIG. 2). In the embodiment of FIGS. 1 to 3, the width of the body at cross-section A-A in FIG. 2 is 25.2 mm, and the height is 40.2 mm. These cross-sectional dimensions are for a body 12 (i.e. from nose 11 to tail 13) having a length of 165 mm. Therefore, if the size of the body is increased, say up to 200 mm, the width at cross-section A-A is approximately 30 mm and the height is approximately 48 mm. The size of the body ranges from 85 mm to 200 mm from nose 11 to tail 13. The proportions of the features are generally scaled accordingly.

The body 12 has a bib in the form of a generally elliptical plate 14 extending from the nose 11. In the embodiment of FIG. 1, the elliptical plate 14 is integrally formed with the body 12. However, the elliptical plate 14 may be formed separately to the body 12 and then be affixed thereto e.g. with adhesives. The elliptical plate 14 in FIG. 1 has a length of about 68 mm and a width of about 43 mm. For a body size of 200 mm, the elliptical plate 14 has a length of about 82 mm and a width of about 53 mm. However, for smaller lure sizes e.g. less than 165 mm, the plate is scaled accordingly smaller. While the elliptical plate 14 is shown as extending from the nose 11 in the Figures, in some embodiments the elliptical plate 14 can extend forwardly from a region between the nose 11 and tail 13. In the embodiment of FIG. 1, the plate extends downwards at an angle of about 15° to 30°, such as 20°, relative to a longitudinal direction of the body 12, as shown by arrow 60.

Referring to FIG. 2 is a cross-sectional view of the lure 10 of FIG. 1 along the line A-A. In FIG. 2, the body 12 has an outer skin in the form of covering 24 which surrounds an interior in the form of core 26. The covering 24 can be made of plastic, such as ABS plastic, or other plastics typically employed in injection moulding. The covering 24 has a thickness of about 2.0 to 3.0 mm, however, other thicknesses can be used. For example, smaller lures can have a thinner covering 24 compared to larger lures. For lures that are intended to attract fish with sharp and/or abrasive teeth, the covering can be thicker than 3.0 mm.

Figure 5:
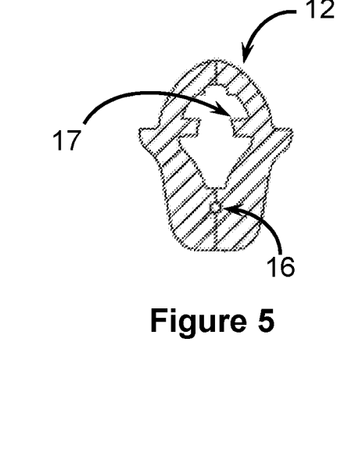
FIG. 5 shows a cross-section along line B-B in FIG. 4.

The core 26 is a hollow region within the body 12. Protruding from the inner surface of the covering 24 are ribs 17 which help to stiffen covering 24. In the embodiment of FIG. 2, the ribs 17 are integrally formed with the covering 24. The arrangement of ribs 17 can be better viewed with reference to FIGS. 4 and 5. The ribs 17 form a lattice arrangement on the interior of the body. FIG. 5 is a cross-sectional view of FIG. 4 along line B-B showing how the ribs 17 project from the inner surface of the body towards the interior. In some embodiments, core 26 is formed of foam, such as expanded polystyrene, expanded ABS or expanded polyurethane. In some embodiments, the core is a honeycomb structure defined by walls and voids. The honeycomb structure can comprise tessellated squares. The honeycomb structure can be formed from the same material as the covering e.g. ABS plastic.

The body 12 also has a weighted portion in the form of first weight 30 and second weight 32 (FIG. 4). The first and second weights 30 and 32 are positioned adjacent to the first and second U-shaped projections 18 and 20. The weights 30 and 32 are generally lead-based, but any suitable material that is denser than the covering 24, core 26 and/or water can be used. Since the weights 30 and 32 are generally positioned in a lower half of the body, the weights 30 and 32 act as ballast to keep the lure 10 in an upright position when being trolled in the water. The position of the weights 30 and 32 determines the centre of gravity for the lure 10. Depending on the application of the lure i.e. the type of fish that the lure is intended to catch, the weights 30 and 32 can be positioned closer to the nose 11 or tail 13.

In the embodiment of FIGS. 1 to 4, the elliptical plate 14 is made from the same material as the covering 24. However, when the elliptical plate 14 is not integrally formed with the covering 24, the elliptical plate 14 can be made from a different material (e.g. a reinforced polymer or polymer composite to provide increased stiffness). While the elliptical plate 14 is shown as generally being planar, in some embodiments the elliptical plate 14 can have a contoured surface with e.g. projections and cavities to alter the in use hydrodynamics of the lure 10. This can help to provide a lure with desirable trolling characteristics, such as diving profiles and/or tracking profiles that help to mimic bait fish, so as to attract target fish.

The covering 24 is painted to so that the lure 10 resembles bait fish. Other distinctive markings that attract fish to lure 10 can also be used. In some embodiments, a top portion of the covering 24 has a reflective surface that resembles fish scales (not shown). The colours and design of the painted covering are selected to target specific fish. The covering 24 in some embodiments is fitted with additional features that extend from the covering, such as soft rubber fins that wave about when the lure 10 is trolled through water. These additional features can make the lure 10 further resemble bait fish. The elliptical plate 14 as shown in the Figures is not painted, and is instead formed of transparent plastic. Keeping the elliptical plate 14 transparent ensures that only the body 12 resembles a bait fish. However, in some embodiments, it can be beneficial to provide distinctive markings on elliptical plate 14 to attract fish. In a specific embodiment, the elliptical plate 14 is clear ABS plastic and the covering 24 is painted ABS plastic.

The body 12 has a recess 21 near second U-shaped projection 20. The recess 21 allows a hook attached to second U-shaped projection 20 to sit closer to the body 12 so as to provide a streamlined profile. This can help to increase lure stability when the lure 10 is being trolled at speed, such as 12 knots. Alternatively, a hook can be connected to the first U-shaped projection 18 by a tether, such as wire or Kevlar rope or cable. The hook and/or tether can then be temporarily secured with a tie, for example using a small cable tie, to temporarily secure them to the second U-shaped projection 20. Once a fish strikes and is engaged with the hook, the tie breaks allowing the hook to be tethered only to U-shaped projection 18. This arrangement helps to improve lure stability when catching a fish, whilst then allowing the lure 10 to still be securely engaged with a fish when a fish is being reeled in. Using a flexible tether can reduce the ability of the fish, through its use of violent shaking movements, to form a lever against the lure body and so come free when being reeled in.

Figure 6:
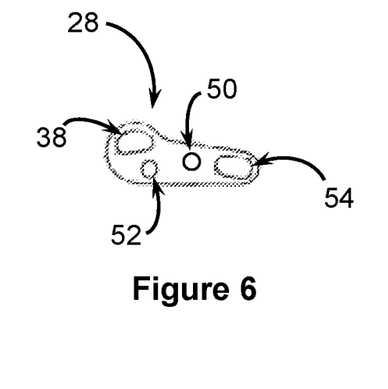
FIG. 6 shows an embodiment of a connection member.

Now referring to FIG. 4 and FIGS. 6 to 10, the body 12 has a cavity in the form of elongate channel 40 located towards the nose 11 of the body 12. The channel 40 extends to define an opening at an upper surface 43 of the elliptical plate 14. Located within channel 40 is a connection member in the form of plate 28. A major plane of the plate 28 extends vertically in use of the lure 10 (see FIG. 7). Plate 28 is retained in the channel by retaining members/connectors in the form of pins 42 and 44. Pins 42 and 44 pass through apertures 50 and 52, respectively, located in plate 28. In the embodiments of FIGS. 4 and 6, apertures 50 and 52 have a diameter of about 1.5 mm to 2.5 mm such as about 2.4 mm, 2.0 mm or 1.5 mm, and the pins 42 and 44 have a diameter of about 1.0 to 2.0 mm, such as about 2.0 mm, 1.8 mm, 1.5 mm, 1.2 mm or 1.0 mm. Since apertures 50 and 52 are about 35% to 75% larger than the diameter of pins 42 and 44, such as about 65%, plate 28 is able to move along and up and down with reference to the pins 42 and 44, as described in more detail with reference to FIGS. 7 to 10. The ratio of the diameter of pins 42/44 to aperture 50/52 range from about 1:1.45 to 1:1.65. Having ratios outside this range means that the ability of the lure to self-centre in use can be diminished, and the lure may start to track from side-to-side. This means that the lure will generally tend to blow out of the water.

While pins have been described in FIG. 4, retaining members having different cross-sections, such as rectangular, square and/or oval, can be used in some embodiments. In some embodiments, the diameter and cross-section of pin 42 and aperture 50 can differ to that of pin 44 and aperture 52.

An in-use distal end of the plate 28 has a distal aperture in the form of an eyelet or connection aperture 38 for connecting the plate 28 to fishing line (FIG. 6). The connection aperture 38 has a semi-oval shape. In the embodiment of FIG. 6, connection aperture 38 has a length of about 5.6 mm and a width of about 3.3 mm. However, other dimensions can be used for the connection aperture in alternative embodiments. The design of plate 28 means that it can be scaled up and down depending on the size of the lure 10. As shown in FIG. 4, a connection (e.g. split) ring 39 is secured to aperture 38.

The positioning of connection aperture 38 relative to the elliptical plate 14 and the nose 11 of the body 12 affects the diving characteristics of the lure 10. As the position of the connection aperture 38 is moved away from the nose 11 and closer to the tip (i.e. front) of elliptical plate 14, the lure 10 tends to remain close to the surface of the water in use. Conversely, moving the connection aperture 38 towards the nose 11 away from the tip of the elliptical plate 14 causes the lure 10 to dive deeper in use. Placing the connection aperture 38 too close or too far from the nose causes the lure to not track correctly when being trolled in use. For example, the lure 10 may cavitate underwater. Alternatively, the lure may jump out of the water. Therefore, the positioning of the connection aperture 38 affects the ability of the lure 10 to self-centre. In the embodiment of FIG. 1 to FIG. 4, the distance between the nose 11 and tail 13 is 165 mm, and the connection aperture 38 is about 34 mm in front of the nose 11. Since the elliptical plate 14 is about 68 mm long, the connection aperture 38 is about 35% along the length of the elliptical plate 14 when measured from the nose 11. Generally, the connection aperture 38 is about 25% to 40% along the length of the elliptical plate 14 when measured from the nose 11.

The size of connection aperture 38 is not critical, but rather the location of a centre point of the top of the connection aperture 38 in relation to the size of the elliptical plate 14 is important to a desired lure performance. Generally, each size of the lure 10 has to be tested for the optimal position of connection aperture 38. Whilst it can be proportionally scaled down or up once a relative position is known on one size of lure, and it can be shown that the lure will then swim with this scaling, it is often the case that the best action is not achieved by just scaling this position. The exact position of connection aperture 38 relative to elliptical plate 14 has to be tested on each size to determine an optimal position that allows maximum depth and speed.

Figure 7:
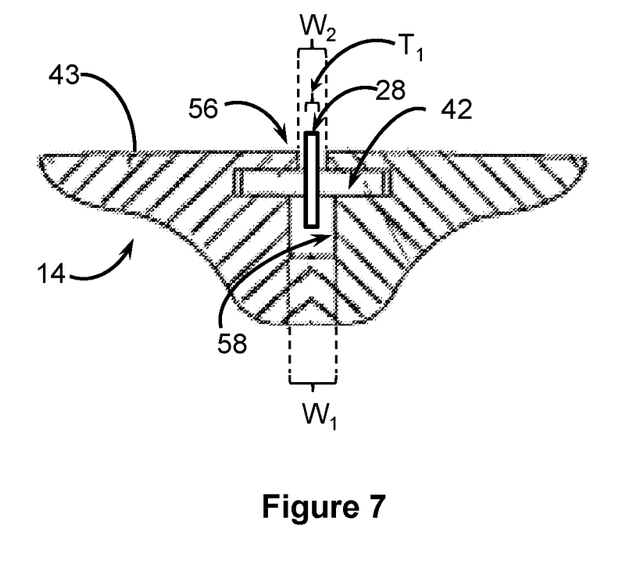
FIG. 7 shows a cross-section along line C-C from FIG. 4.

Pins 42 and 44 are fixed into the elliptical plate 14 in a direction approximately transverse to a longitudinal direction (i.e. the direction of arrow 60) of channel 40. In the embodiment of FIGS. 5 and 7, pins 42 and 44 are received in bores formed in elliptical plate 14. The bores are formed during manufacture of the plate. In use, plate 28 contacts pins 42 and/or 44. Therefore, any forces applied to plate 28 are transferred to pins 42 and 44 and into elliptical plate 14. The load distribution between pins 42 and 44 varies depending on an angle of the load acting on the plate 28 from fishing line attached to connection aperture 38.

The strength of pins 42 and 44 and elliptical plate 14 help to retain plate 28 in the channel 40 in use (i.e. normal use) of lure 10. However, in some circumstances, pins 42 and/or 44 may fail. For example, if a fish that is larger than the intended use of the lure strikes lure 10, pins 42 and/or 44 may be pulled from their respective bores and out of the channel 40. This would normally result in the plate 28 being disconnected from body 12. To ensure that such circumstances do not result in the plate 28 being disconnected from body 12, a proximal end of plate 28 is provided with a proximal aperture in the form of auxiliary aperture 54. An arm in the form of loop 41 is able to pass through auxiliary aperture 54 (loop 41 is also represented as dashed lines in FIG. 3). Loop 41 is formed at a terminal portion of rod 16 by folding a portion of rod 16 back on itself. In the embodiment of FIG. 3, the loop 41 is positioned in a flared region of the elongate channel 40, as represented by dashed box 31. Flared region 31 accommodates the total width of the loop 41. In some embodiments, the loop 41 can be partially embedded in sidewalls of the channel.

The folded back portion of loop 41 is secured to rod 16, for example by spot welds as shown as dots 29 in FIG. 3. Optionally, the folded back portion may be secured by lashing with yarn and/or adhesives. The inner diameter of loop 41 is about 3.0 mm. In another embodiment, the inner diameter of loop 41 is about 2.5 mm. In an embodiment, the diameter of the loop is determined by the space available within the elliptical plate. While the embodiment of FIG. 4 shows rod 16 being integrally formed with loop 41, as well as ring 22 and U-shaped projections 18 and 20, this is not always necessary and each feature may be formed from its own section of rod. The loop 41 is generally used for lures when a size of the body 12 is about 200 mm to 140 mm, such as 165 mm. The actual size of the loop 41 is not important so long as it does not engage with the plate 28 in normal use of the lure 10.

The term "engage" as used herein in relation to the engagement of the loop 41 and plate 28 is to be interpreted broadly to mean not touching and/or not transferring any substantial load(s) from the plate 28 to the loop 41 during normal use of the lure. For example, the proximal portion of plate 28 may come into contact with loop 41, but the dimensions of the loop 41, auxiliary aperture 54, channel 40 pins 42 and 44, and/or apertures 50 and 52 may mean that substantial loads exerted onto plate 28 during normal use of the lure 10 are transferred through pins 42 and 44. Minimising or eliminating any loads transferred from the loop 41 to the plate 28 through auxiliary aperture 54 can help the lure 10 to self-centre during normal use of the lure.

If pins 42 and/or 44 fail, the load(s) acting upon lure 10 are transferred from the plate 28 to loop 41 via auxiliary aperture 54. Because loop 41 is only required in the event that pins 42 and/or 44 fail, it does not always need to be in contact or otherwise engaged with auxiliary aperture 54. Therefore, in some embodiments, loop 41 does not touch and/or engage with plate 28 during normal use i.e. when pins 42 and/or 44 have not failed. As described with reference to FIG. 7 to FIG. 10, the plate 28 tends to only engage with the pins and not the loop 41 during normal use of the lure 10. To ensure loop 41 does not touch plate 28, auxiliary aperture 54 has dimensions about twice that of the diameter of the wire forming the loop 41. For example, when the auxiliary aperture 54 is an oval, the width of the aperture may be twice that of a diameter for the wire used to form loop 41, and the length may be about three times the diameter of the wire used to form loop 41. In an embodiment, the wire forming the loop 41 has a diameter of about 1.6 mm and the auxiliary aperture is in the form of a rounded rectangle having a width of about 3.0 mm and a length of about 5.6 mm. In normal use, the loop 41 is positioned to be approximately in the centre of auxiliary aperture 54. For example, if auxiliary aperture 54 has a length of about 5.6 mm, loop 41 is positioned about 2.0 mm from an end of auxiliary aperture 45.

Specific features of the lure 10 are now described with reference to FIGS. 7 to 10. However, certain features have been omitted for clarity.

FIG. 7 shows a cross-section along line C-C from FIG. 4. Channel 40 is formed of side walls having a lower portion 58 and an upper portion. In the embodiment of FIG. 7, upper portion has lips in the form of flanges 56 extending towards each other. This arrangement means that the width $W_1$ of the channel at the lower portion 58 is greater than a width $W_2$ between flanges 56. Generally, the ratio of $W_1:W_2$ is about 1:0.6 to about 1:0.71. For example, the ratio of $W_1:W_2$ may be about 1:0.66. Some embodiments have a ratio of $W_1:W_2$ outside of about 1:0.6 to 1:0.71. In an embodiment, $W_1$ is about 3.5 mm and $W_2$ is about 2.2 mm. In other embodiments, $W_1$ is about 4.0 mm, 3.5 mm, 3.0 mm, 2.5 mm or 2.0 mm. In some embodiments, $W_2$ is about 2.9 mm, 2.2 mm, 1.8 mm or 1.5 mm. Flanges 56 help to increase of the strength of the bores that house pin 42 and 44 so that it is less likely that the bores will fail in use of lure 10. Flange 56 has a thickness of about 0.7 mm to about 1.3 mm, such as 0.8 mm to 1.1 mm. Because $W_1 > W_2$, a the portion of the plate 28 that is proximate the lower portion of the channel is able to pivot about pin 42 and 44 without coming into contact with the lower portion of the sidewall 58, as will be explained in greater detail with reference to FIGS. 8 and 9.

Plate 28 has a thickness $T_1$ that is less than $W_2$. In an embodiment $W_2$ is about 2.2 mm and $T_1$ is about 1.5 mm. In other embodiments, $T_1$ is about 2.0 mm, 1.8 mm, 1.5 mm, 1.2 mm or 1.0 mm. $T_1$ is generally about 50% to 80% $W_2$. Because apertures 50 and 52 are larger than the diameter of pins 42 and 44, plate 28 is able to move along and pivot side to side relative the pins 42 and 44. Therefore, plate 28 is able to pivot from side to side in use in a direction approximately transverse to the longitudinal direction of channel 40. However, the plate 28 in its entirety does not necessarily need to move in the transverse direction. Pin 42 has a length of about 15.0 mm to about 2 mm, such as about 12.0 mm, 11.0 mm, 10.6 mm, 8.0 mm, 7.0 mm, 5.0 mm, 6.0 mm, 4.0 mm or 3.0 mm.

Figure 8A:
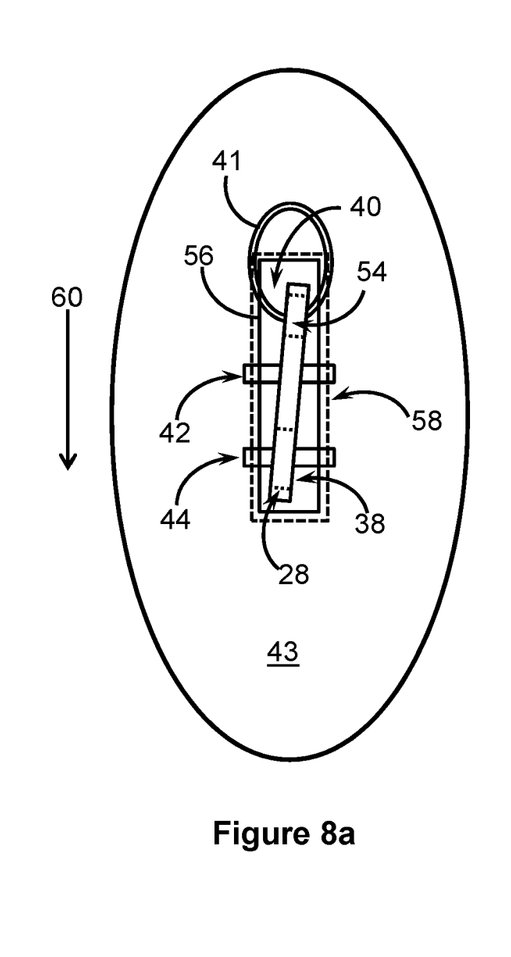
FIGS. 8a and 8b show a close up schematic plan view of the front of FIG. 4.
Figure 8B:
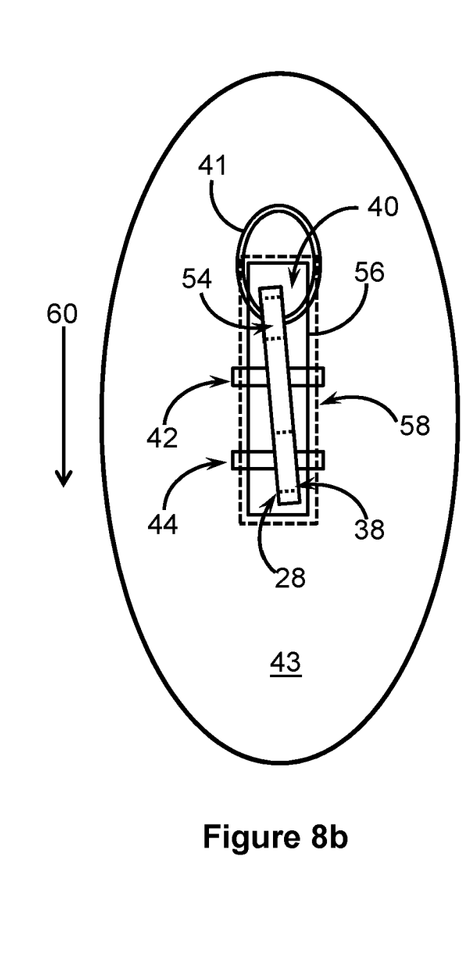

FIG. 8a and FIG. 8b is a schematic top view of the lure 10, omitting most of the lure 10 for clarity. As shown in FIG. 8a and FIG. 8b, the oversized apertures 50 and 52 allow the distal and proximal ends of plate 28 to move along and pivot about relative pin 42 so that the connection aperture 38 moves in a generally transverse direction to the longitudinal direction of the channel, as depicted by arrow 60, towards the sides of channel 40. Put another way, one end of plate 28 pivots to one side of the channel, and an opposite end of the plate 28 pivots to the other side of the channel, and vice versa. Therefore, the transverse movement means generally towards the sidewalls of channel 40. In the embodiment of FIG. 8a and FIG. 8b, arrow 60 is pointing from the front 11 of the body towards an in use front end of elliptical plate 14. Such movement of plate 28 can occur when the lure 10 is not correctly aligned and begins to track off course when being trolled in use. During the movement of plate 28 from side to side as shown in FIG. 8a and FIG. 8b, the auxiliary aperture 54 does not engage with the loop 41 e.g. no load is transferred from the plate 28 to loop 41.

Movement of plate 28 to either sidewall allows the forces acting upon lure 10 to equilibrate so that the lure 10 tracks in a straight line when being trolled i.e. to become centred. Once the lure 10 begins to equilibrate, the plate 28 is then able to align itself generally with the longitudinal direction 60. Depending on the trolling conditions, the plate 28 may be centrally located or may be located closer to one of the sidewalls once it is aligned generally with the longitudinal direction. The term "generally aligned" is to be broadly interpreted to mean approximately parallel to the longitudinal direction. In some circumstances, the plate pivots about pin 44 so that connection aperture 38 moves generally up and down with respect to a base of channel 40. In the embodiment of FIG. 8a and FIG. 8b, the up and down movement is into and out of the page. The pin upon which the plate 28 pivots in generally an up and down movement will be determined by the forces acting through plate 28 and pins 42 and 44. Given plate 28 can pivot about pin 42 and/or 44, plate 28 can move in a direction that is generally perpendicular to the longitudinal direction 60, that is to say in a direction in a range from about 60° to 120° relative to the longitudinal direction 60.

Since the plate 28 is able to move into a position that balances the relative forces applied to the lure, the lure 10 can track correctly in use. This arrangement can reduce lure setup time, since connection aperture 38 may only need to be in approximately the correct position prior to use, where the remaining adjustment is performed by the lure itself in use. The need to adjust the connection aperture 38 after each catch can also be eliminated. Further, allowing the lure to self-centre can allow the lure to be trolled at speeds greater than 10 knots, such as up to 12 knots, and potentially even faster speeds. In an embodiment, the lure 10 can be trolled at speeds of up to 15 knots. The actual speed that the lure 10 is trolled will be determined by the type of target fish.

Figure 9A:
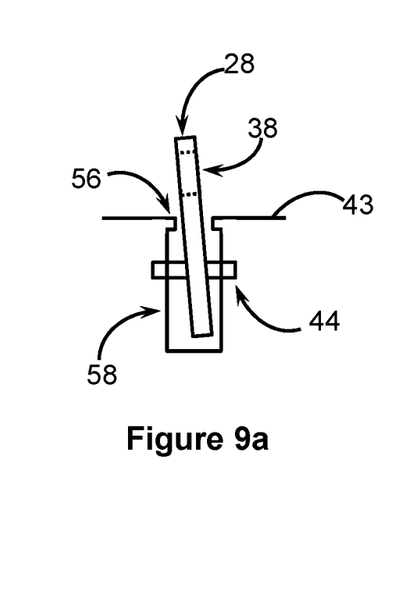
FIGS. 9a and 9b show a close up schematic cross-section view of a front of FIG. 4.
Figure 9B:
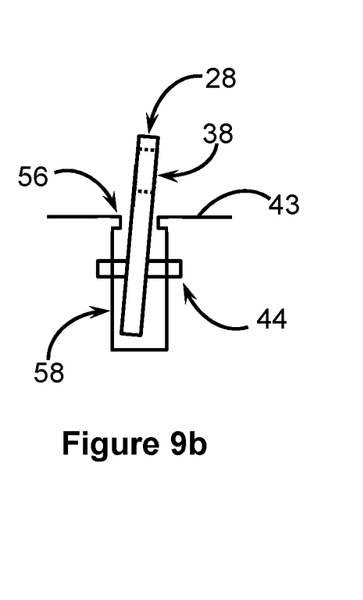

FIG. 9a and FIG. 9b is a schematic representation of the lure 10 across a cross-section through pin 44. As shown in FIG. 9a and FIG. 9b, plate 28 is able to literally tilt back and forth about pin 42 in a sideways direction towards and away from the sidewalls of the channel 40 so that the connection aperture 38 can move in a general perpendicular direction to the longitudinal direction. In FIG. 9a and FIG. 9b, the longitudinal direction extends out of the page. Much in the same way the plate 28 moves in response to forces exerted on the lure 10, as described in reference to FIG. 8a and FIG. 8b, plate 28 will tilt laterally when the lure 10 is not centred when being trolled. As the lure 10 begins to self-centre, plate 28 will then begin to position itself to be more vertically aligned i.e. be in a position that is approximately perpendicular to the plane of the top surface 43 of elliptical plate 14. While only pin 42 is shown in FIG. 9a and FIG. 9b, the plate 28 also moves in a similar way relative to pin 44 as that for pin 42.

Figure 10A:
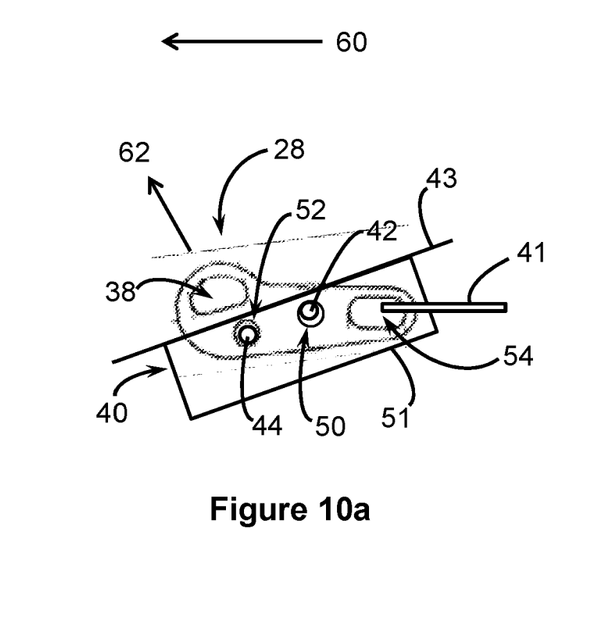
FIGS. 10a and 10b show a schematic elevation view of the front of FIG. 4.
Figure 10B:
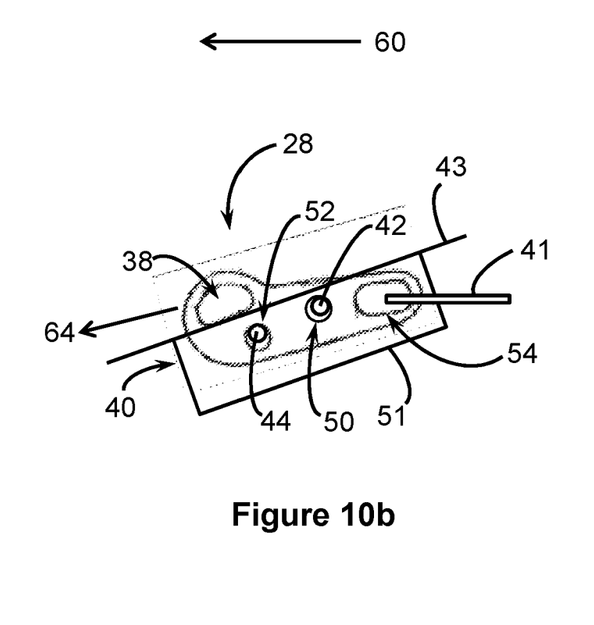
Figure 11:
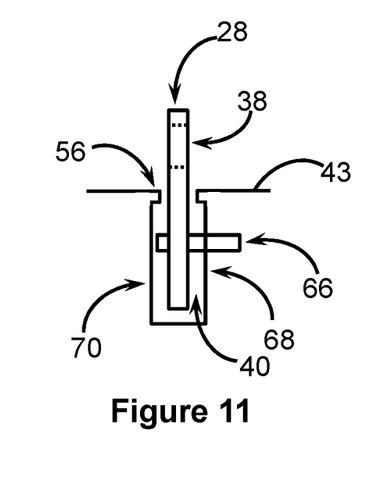
FIG. 11 shows another embodiment of a fishing lure having an alternative cavity arrangement of the lure.

In FIG. 9 and FIG. 10 the pins 42 and 44 are illustrated as extending across the entire width of cavity 40. However, in some embodiments the pins may only extend across a portion of the width of the cavity. For example, in FIG. 11, pin 66 is embedded in a first sidewall 68. Pin 66 extends from the first sidewall 68 into the channel 40 and towards a second sidewall 70, but the pin 66 terminates before engaging the second sidewall 70 so as to extend across a portion of the cavity. Such an arrangement may be beneficial during manufacture since less tolerance is required during manufacture since the pin(s) do not need to match up with opposite facing bores.

In reference to FIG. 10a and FIG. 10b, a side view of the plate 28 in different orientations in the channel 40 in shown. For clarity, many features of lure 10 are omitted from FIG. 10a and FIG. 10b. Because apertures 50 and 52 are larger than the diameter of the pins 42 and 44, the plate 28 is able to move towards and away from base 51 of channel 40 depending on the forces being applied to the plate 28 (i.e. tilt or rock up and down). In FIG. 10a, force 62, such as tension being applied in use from a fishing line, is directed generally perpendicular to the base 51 of the channel 40. The force 62 pulls the plate 28 out of the channel until a lower region of aperture 52 contacts a lower region of pin 44, and an upper region of aperture 50 contacts an upper region of pin 42. The terms "upper" and "lower" are with respect to the base 51 of the channel 40 and are not intended to limit the lure 10 to any particular orientation. The plate 28 moves relative the channel when the direction of the force changes. For example, in FIG. 10b, force 64 is directed generally parallel to the base 51 of the channel 40. In FIG. 10b, the force 64 pulls the plate 28 towards a distal end of the channel 40 so that the proximal sides of apertures 50 and 52 contact pins 42 and 44. Put another way, the plate 28 moves generally up and down with respect to the base 51 such that a tilting up or rocking of the plate 28 at one end, and a tilting or rocking down of the plate 28 at the opposite end (and vice versa).

The amount the plate 28 can move in and out of channel 40 is determined by the diameter of apertures 50 and 52 and the diameter of pins 42 and 44. As the size of the apertures 50 and 52 increases relative to the diameter of the pins 42 and 44, the plate 28 able to move in and out of channel more compared to when the size of the apertures 50 and 52 decreases relative to the diameter of the pins 42 and 44. During the movement of plate 28 in and out of the channel 40, as shown in FIG. 10a and FIG. 10b, the auxiliary aperture 54 does not engage with the loop 41.

Since the plate 28 can move, in use, in a multitude of directions (i.e. multiple degrees of freedom), as shown in FIGS. 8 to 10, the plate 28 is allowed to function as a floating anchor point, which means that the plate 28 is able to move to balance out the forces acting on the lure 10 so that the lure is able to self-centre. Adjusting the relative sizes of the diameters of apertures 50 and 52 and pins 42 and 44, the plate thickness $T_1$, and the width of the channel $W_1$ and $W_2$, helps to control how much the plate 28 is able to move relative to the channel. These features can be adjusted to provide lures with specific self-centring abilities. For example, if a ratio of $W_2:T_1$ is too large, the channel 40 allows the plate 28 to "wander" from side to side on the pins away from a centre point of the channel 40 centre point, and the lure cannot self-centre to find its own centre point. This means that the lure will tend to swim from left to right, which means that a top speed of the lure may not be achieved and the lure may tend to easily break out of the water. The presence of the sidewalls, for example lips 56, inhibits the "wander" of the plate 28 and instead allows the plate 28 to wiggle. Conversely, if the ratio of $W_2:T_1$ is too small, the lure 10 cannot self-centre in use to find its own centre point, and the sidewalls walls of the channel, for example the lips 56, inhibit the wiggle in the plate 28. Similarly, if the apertures 50 and 50 are too small and/or the pins 42 and 44 are too large, the plate 28 cannot get enough "wiggle" room to self-centre in use. Effectively, what happens in normal use of the lure 10 is that the plate 28 stays in position (i.e. in a straight generally uprights orientation) and the lure 10 moves (i.e. "wiggles") relative to the plate.

In some embodiments, however, there are situations where a larger ratio of $W_2:T_1$ is used to provide a lure that in use has the "wandering" action, that is to say a lure that moves in use in a left to right direction. These embodiments may have a $W_1:W_2$ ratio outside of about 1:0.6 to 1:0.71. The lures of embodiments with the "wandering" action tend to have a shallower elliptical plate 14. For some lures, such as shallow diving "Square bib" design that are designed to dive to around 4-5 ft, this wandering action can be useful for attracting target fish.

Figure 12:
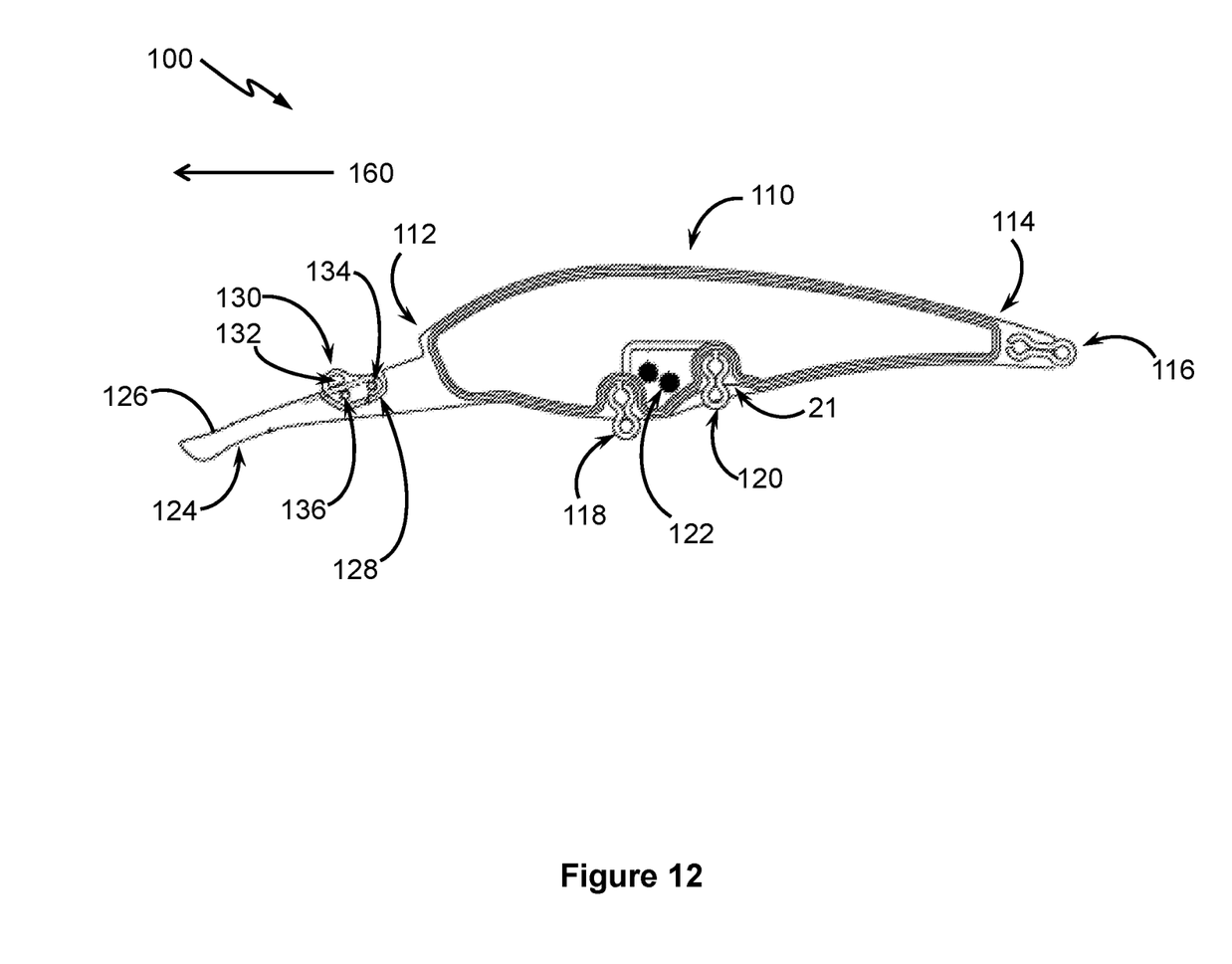
FIG. 12 shows a cross-sectional elevation view of an another embodiment of a fishing lure as disclosed herein.

FIG. 12 shows another embodiment of a lure 100. Lure 100 shares similar features to lure 10, in that lure 100 has a body 110 having a front end in the form of a nose 112 and a rear end in the form of a tail 114. An eyelet in the form of ring 116 is positioned at the tail 114. The body 110 also has two hook attachment points, in the form of first oval-shaped projection 118 and second oval-shaped projection 120, which are positioned approximately in the middle of the body 110. Ring 116 is formed of a single piece of wire, for example stainless steel wire having a diameter of about 1.0 mm and a length of about 11.0 mm. Similar, oval-shaped projections 118 and 120 are each formed of a single piece of wire, such as stainless steel wire having a diameter of about 1.0 mm and a length of about 9.0 mm. The body 112 has a length of about 100 mm. A weighted portion provided as two adjacently positioned weights 122 is also provided adjacent oval-shaped projections 118 and 120. Weights 122 may be positioned anywhere between the nose 112 and the tail 114 to give the lure 100 a desired centre of gravity.

Body 112 also has a bib in the form of elliptical plate 124. A longitudinal direction 160 extends alone the body from the tail 113 to the nose 111. A cavity in the form of channel 128 opens up to an in use upper surface 126 of the elliptical plate. The channel 128 extends generally along the longitudinal direction 160 to define an opening at an upper surface 126 of the elliptical plate 124. A connection member in the form of a plate 130 is retained in the channel 128 by retaining members in the form of pins 134 and 136. A major plane of plate 130 extends vertically in use of the lure, similar to that shown in FIG. 7. Unlike plate 28, plate 130 does not have an auxiliary aperture located at a proximal end of the plate 130 that is configured to engage with an arm. Because lure 100 is designed for use with smaller fish, the strength of pins 134 and 136 means that it tends to be unlikely that the pins 134 and 136 and/or the bores in the elliptical plate 124 in which the pins are housed will fail in use. However, lure 100 can be used to catch larger fish, such as sport fish, provided the strength of the elliptical plate 124 and the pins 134 and 136 are strong enough to withstand the forces generated in use of the lure 100. Therefore, not all embodiments of lure 10 require the use of auxiliary aperture 54 and loop 41.

Figure 13:
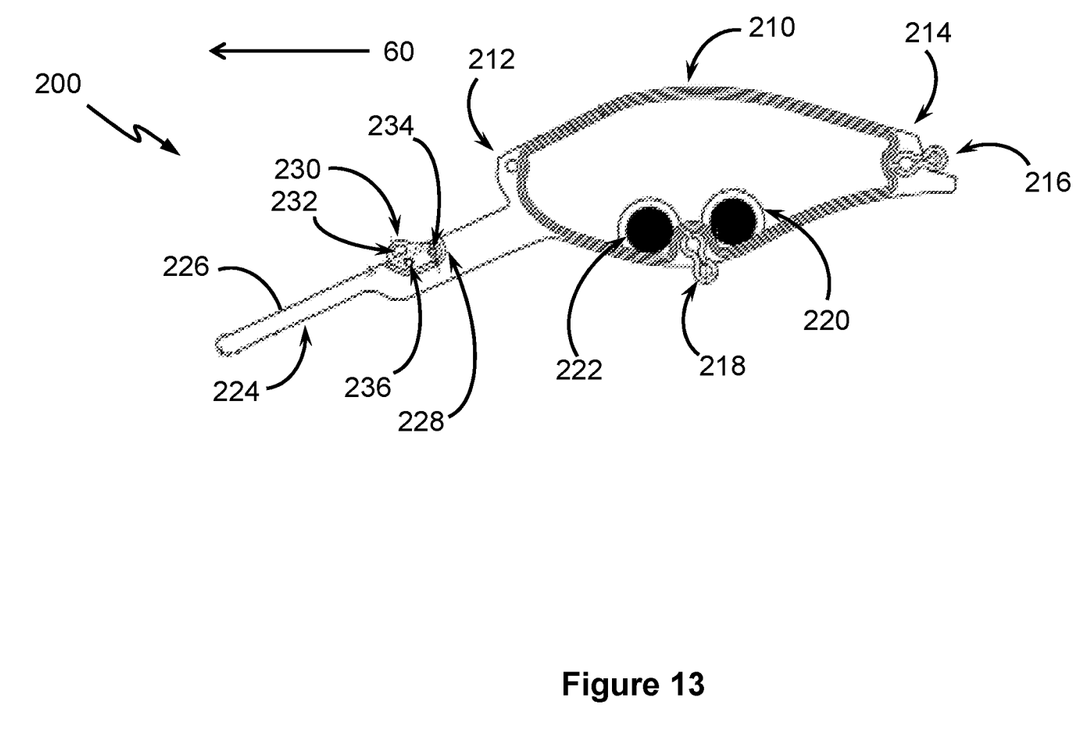
FIG. 13 shows a cross-sectional elevation view of yet another embodiment of a fishing lure as disclosed herein.

FIG. 13 shows yet another embodiment of a lure. Lure 200 is similar to lure 100, e.g. has nose 212, tail 214, ring 216, elliptical plate 224, channel 228, plate 230 having a major plane extending vertically in use of the lure, and pins 234 and 236. However, only one oval-shaped projection 218 is provided. This is because lure 200 is intended to catch small fish. A body length from the nose 212 to tail 214 of lure 200 is about 80 mm.

In both FIG. 12 and FIG. 13, channel 128/238 is formed of side walls having a lower portion and an upper portion having lips, similar to that shown in FIG. 7. A width between the lips for lure 100/200 is about 1.5 mm and a width between a lower portion of channel 128/238 is about 2.0 mm. Plate 130/230 has a thickness of about 1.0 mm. Pins 134/234 and 136/236 have a diameter of about 1.0 mm and the corresponding apertures in plate 130/230 though which pins 134/234 and 136/236 pass is about 1.5 mm.

The embodiments described above use two pins to retain the plate 28/130/230 into channel 40/128/228. However, other embodiments may have more or less than two pins. For example, three pins, four pins, or more than four pins may be provided. Some embodiments may only use one pin. In embodiments with only one pin, the channel may be provided with additional features, such as abutment members to control the degrees of freedom of the plate with respect to the lure longitudinal direction. In another embodiment, the pins are replaced with a single bar having a generally rectangular or oval cross-section, and the plate 28 is provided with a similarly shaped aperture having dimensions larger than the respective cross-section. In these embodiments, one side of the bar will contact a top portion of the aperture and the other side of the bar will contact a bottom portion of the aperture when the plate 28 moves in and out of the channel 40. The contact of the top portion and/or bottom portion can help to limit the degrees of movement.

In the claims which follow and in the preceding description of the fishing lure, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the lure.

It will be understood to persons skilled in the art of the invention that many modifications may be made without departing from the spirit and scope of the invention.

What is claimed is:

1. A self-centering fishing lure, comprising:
   a body being at least partially fish-shaped having a top, a bottom, a first side, a second side, a front end and a rear end and extending in a longitudinal direction, the body further extending in a vertical direction and a width direction, the vertical direction extending from the top to the bottom of the body and the width direction extending from the first side to the second side;
   a cavity located towards the front end and on top of the body, the cavity extending in the longitudinal direction of the body more than in the width direction; and
   a plate shaped connection member configured for attaching the body to a line, the connection member being vertically oriented and located at least partially in the cavity and retained therein by one or more retaining members, each of the one or more retaining members configured to extend into the cavity substantially in the width direction to retain the connection member in the cavity in use of the lure,
   wherein the connection member, in use of the lure, is configured to move relative to the body in:
      a pivot movement in the cavity, wherein the pivot movement is a movement about an axis substantially parallel to the vertical direction;
      a movement along the vertical direction; and
      a lateral tilting movement within the cavity, wherein the lateral tilting movement is a movement about the longitudinal direction, and
   wherein the lure is configured so that the line exerts a force on the connection member substantially in the longitudinal and vertical directions to cause the connection member to move relative to the body.

2. A fishing lure as claimed in claim 1, wherein the connection member extends substantially more in the vertical direction and in the longitudinal direction than in the width direction.

3. A fishing lure as claimed in claim 1, wherein the connection member has a thickness that is about 50-80% of a width of the cavity.

4. A fishing lure as claimed in claim 1, wherein the one or more retaining members are each arranged to pass through a respective aperture of the connection member.

5. A fishing lure as claimed in claim 4, wherein the one or more respective apertures has a diameter about 1.1 to 2.0 times greater than a diameter of the one or more retaining members.

6. A fishing lure as claimed claim 1, wherein the connection member is retained in the cavity by two retaining members.

7. A fishing lure as claimed in claim 1, wherein the one or more retaining members is in the form of a pin that extends across the cavity in the width direction.

8. A fishing lure as claimed in claim 7,
   wherein the cavity opens in the vertical direction, the cavity defining an opening into the body, wherein the opening is located on a top surface of the body;
   wherein the cavity is defined by two sidewalls extending substantially parallel to the longitudinal direction;

wherein the one or more retaining members includes two pins; and wherein each of the two pins extends between the two sidewalls and through a respective aperture of the connection member to retain the connection member at least partially within the cavity.

9. The fishing lure according to claim 8 wherein the body comprises a bib and the cavity is located in the bib.

10. A fishing lure as claimed in claim 1, further comprising an arm located in the cavity, the arm being associated with the connection member such that, in use, the arm does not apply a load to the connection member.

11. A fishing lure as claimed in claim 10, wherein the arm passes through a proximal aperture located at a proximal end of the connection member.

12. A fishing lure as claimed in claim 11, wherein the proximal aperture has an effective diameter about twice a diameter of the arm.

13. A fishing lure as claimed in claim 10, wherein the arm extends from the cavity into the body and wherein the arm follows a labyrinthine path, to extend through a series of passageways defined in the body, through to the rear end of the body.

14. A fishing lure as claimed in claim 13, wherein the arm at the rear end of the body is folded back onto itself to define an eyelet at the body rear end.

15. A fishing lure as claimed in claim 13, wherein the body comprises one or more hook attachment points and wherein the labyrinthine path of the arm through the rear end of the body defines the one or more hook attachment points that project from the body.

16. A fishing lure as claimed in claim 1, wherein the cavity is defined by sidewalls, each having an upper portion and a lower portion, and wherein the upper portions of the sidewalls have lips extending towards one another such that a width of the cavity between the lips is less than a width of the cavity between the lower portions of the sidewalls.

17. A fishing lure as claimed in claim 16, where the cavity width between the lower portions of the sidewalls is about 1.1 to 2.0 times greater than the cavity width between the lips.

18. A fishing lure as claimed in claim 1, wherein a front end of the body is configured to define a bib, and wherein the cavity is defined to open out onto an in-use upper face of the bib.

* * * * *